Figure 1:
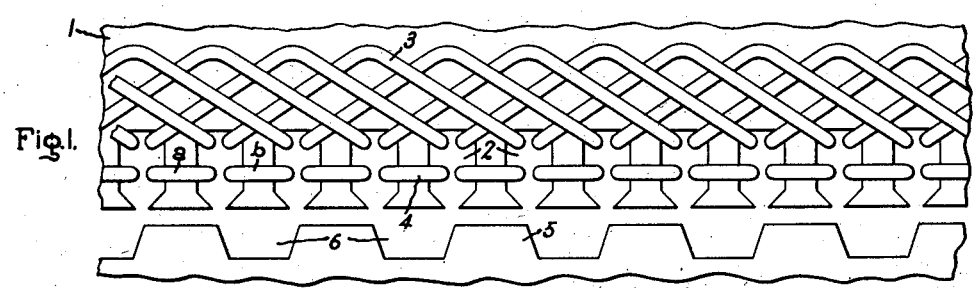

Sept. 16, 1947.  E. C. BARWICK  2,427,544
VOLTAGE REGULATOR
Filed Jan. 29, 1944

Inventor:
Emerson C. Barwick,
by Harry E. Dunham
His Attorney.

Patented Sept. 16, 1947

2,427,544

UNITED STATES PATENT OFFICE 2,427,544

VOLTAGE REGULATOR

Emerson C. Barwick, Rugby, England, assignor to General Electric Company, a corporation of New York Application January 29, 1944, Serial No. 520,252
In Great Britain May 12, 1943

5 Claims. (Cl. 171—119)

This invention relates to voltage regulators and more particularly to the speed control of stator fed alternating current commutator motors.

For many applications and, in particular, for controlling stator-fed alternating current commutator motors, a variable voltage, polyphase alternating supply is required, which is substantially constant in phase, but at the same time variable in magnitude from a maximum in one sense to a maximum in the opposite sense. In addition, the supply voltage is frequently required to contain a component of approximately constant magnitude and in quadrature time phase relative to the main variable component. In the case of a commutator motor the variable voltage supply is connected to the commutator brush-gear and is used to vary the speed; and the constant quadrature component is used to give power factor adjustment.

A supply having the characteristics described above has, in the past, been obtained by using two polyphase induction regulators of conventional electrical design, the two rotating members being either mounted on a common shaft, or mechanically coupled in some other way. The primary windings of the two regulators are connected in parallel to a source of alternating power in such a manner that movement of the regulator rotors advances the phase of the secondary voltage in one regulator and retards the phase of the secondary voltage of the other regulator. If the two regulators are designed to give equal secondary voltages and the two secondary windings are connected in series, an output voltage from the combination of regulators can be obtained which will have constant phase, and be variable in magnitude from a maximum in one sense to a maximum in the opposite sense.

The quadrature component of voltage is usually introduced by means of an additional winding on one of the regulator members which carries the primary winding or by an additional winding on the stator of the commutator motor, or by means of an auxiliary transformer.

The present invention consists in obtaining a supply voltage having the required characteristics from a single regulator which is provided with a stationary member having a number of slots in which are placed both primary and secondary windings, and a rotatable member having a number of open-type, unwound slots. The number of rotor slots is preferably exactly divisible into the number of stator slots.

The primary winding is of conventional type and is preferably though not necessarily placed at the bottom of the slots. The secondary winding which occupies the same slots as the primary winding is composed of coils with a pitch which is preferably equal to half the pitch of the rotor slots. The interconnection of the secondary coils is such that the voltage induced in a coil whose axis in one position of the rotor is on the center line of a rotor slot, has a component which opposes the voltage induced in a second coil, whose axis in the same position of the rotor is on the center line of a rotor tooth.

The rotor slots are preferably of such a width that at the outside diameter of the rotor they are equal in width or wider than the rotor teeth.

In order that the invention may be more readily understood, a regulator according to the invention having twelve slots on the stator and six slots on the rotor, and suitable for a three-phase input and for giving a three-phase output will now be described. The accompanying diagrams have been drawn to assist in the description of this example.

Figure 2A:
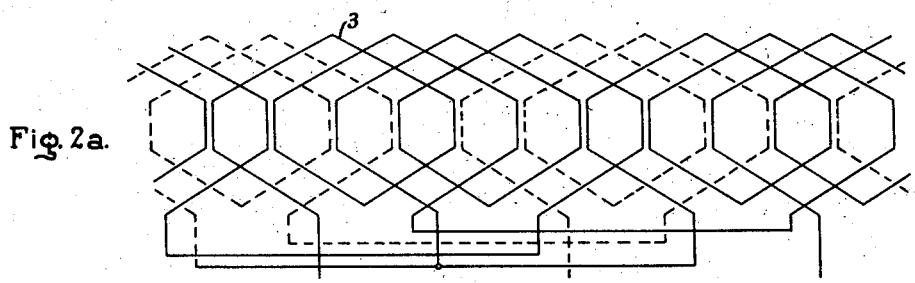
Figure 2B:
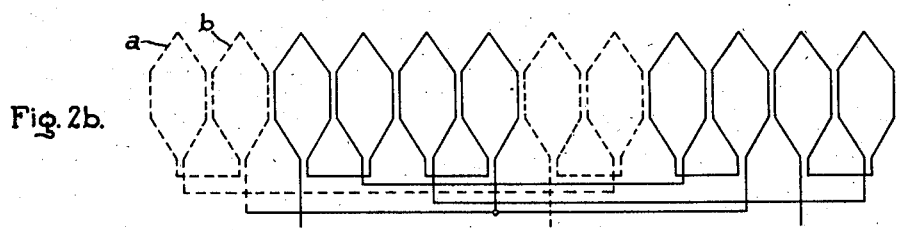
Figure 4:
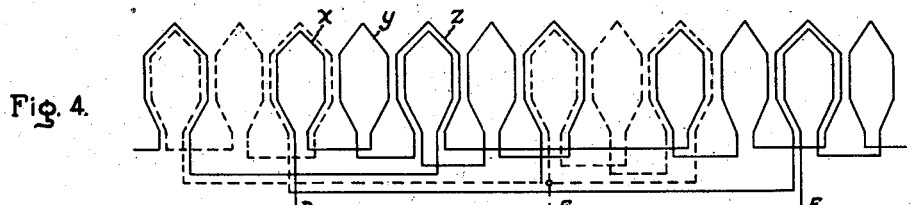
Figure 3:
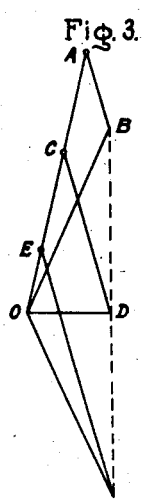
Figure 5:
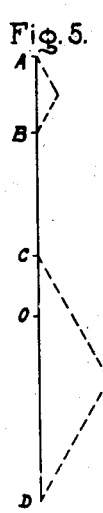
Figure 6:
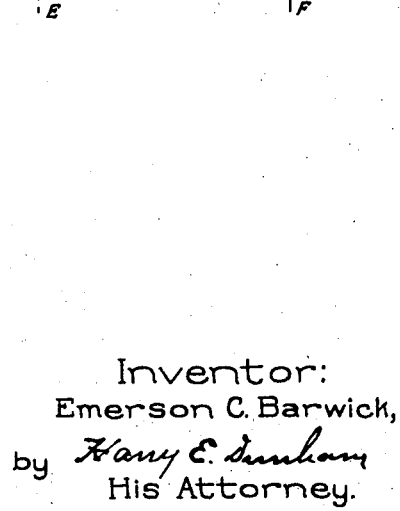

In the drawings Fig. 1 shows diagrammatically part of the core and windings of a regulator constructed according to the invention. Figs. 2a and 2b show typical connections of the primary and secondary windings. Fig. 3 is a vector representation of the voltages induced in the secondary coils of the winding shown in Fig. 2b. Fig. 4 shows an alternative secondary winding to that shown in Fig. 2b, and Fig. 5 is the vector diagram appropriate to the winding illustrated in Fig. 4. Fig. 6 is a vector diagram for the arrangement of Fig. 4 where the secondary coil turns are unequal.

In Fig. 1, 1 represents the stator core which is composed of soft iron laminations and is provided with twelve slots 2. At the bottom of the slots the primary winding 3 is wound. In the example being described the primary winding is designed for a 3-phase supply, and is of the 2-pole, double layer lap type with coils having a pitch of 66⅔ per cent of the pole pitch. 4 represents the secondary winding which is also of the two-layer type and has coils which embrace only one stator tooth. The rotor has a core 5, also composed of soft iron laminations, which is provided with six slots 6. For the purpose of this description, two coils of the secondary winding have been given identification letters $a$ and $b$.

It will be apparent that the permeance of the air gap opposite the rotor teeth will be considerably greater than the permeance of the air-gap opposite the rotor slots.

When the primary winding, typical connections of which are shown in Fig. 2a, is connected to a source of alternating power, it will set up magnetic flux and of this flux a very much greater proportion will link a coil such as that referred to as $a$ than will link a coil such as that referred to as $b$ due to the differing permeances of the airgap. The voltages induced in the two coils will differ correspondingly and by connecting the coils in series opposition as shown in Fig. 2b the resultant voltage of the two coils will be the vector difference of the two voltages. Fig. 3 represents vectorially the voltages experienced. In Fig. 3, OA represents the voltage in coil $a$, and AB the voltage in coil $b$. The resultant voltage will be OB. The angle between OA and AB is dependent on the number of stator slots per pair of magnetic poles of the primary winding. In the example described it equals 360/12-30 electrical degrees.

If the rotor of the regulator is now moved through a distance corresponding to the pitch of the stator slots, coil $a$ (Fig. 1) will now link only a small flux compared with the flux linked by coil $b$. The vector representation of the new condition is also shown in Fig. 3 where OE represents the voltage now induced in coil $a$ and EF the voltage in coil $b$, giving a resultant voltage of OF. Vectors OC, CD and OD represents the voltages obtained with the regulator rotor midway between the first and second positions described above, i. e. when the center line of a rotor slot coincides with the center line of a stator slot.

The locus of the end of the vector representing the resultant voltage will thus be the line BDF. The output voltage may therefore be considered to have one component which is constant in phase and variable in magnitude from DB to DF, and another component OD which is in quadrature with the first, and constant in magnitude. If coils $a$ and $b$ differ in the number of turns, then DB and DF will differ in magnitude. This is advantageous in some cases. Thus a regulator according to the invention gives an output voltage having the desired characteristics, and employs only a single unit.

It is sometimes desired to obtain an output voltage having a smaller quadrature component that is obtained with the winding described above. A secondary winding of the type shown in Fig. 4 will enable such an output to be obtained.

Considering the three consecutive coils marked $x$, $y$ and $z$ belonging to a secondary phase belt group in Fig. 4, it will be apparent that the resultant voltage of coils $x$ and $z$ can be made as near to 180° out of phase with the voltage of coil $y$ as is desired, by suitably choosing the number of turns in the two coils $x$ and $z$. If the turns in these two coils are made equal in number then the resultant voltage from them will be in exact phase opposition to the voltage in coil $y$. The vector diagram in Fig. 5 has been drawn to represent the voltages obtained when the number of turns in each of the coils $x$ and $z$ is 58 per cent of the number of turns in $y$. In Fig. 5 OA corresponds to the voltage in coil $y$ and AB the resultant voltage of coils $x$ and $z$ in series, when a rotor tooth is in line with the axis of coil $y$. Movement of the rotor to bring a rotor slot in line with the axis of coil $y$ changes the vectors to OC and CD. The locus of the end of the vector representing the output voltage is thus a straight line BD passing through O. It will be seen therefore that if the coils $x$ and $z$ have equal numbers of turns, then the quadrature component of output voltage will be zero.

Thus the quadrature component of the output voltage can be controlled independently of the variable magnitude component, by suitably selecting the number of turns in the coils.

This is shown more clearly by means of the vector diagram of Fig. 6 where the number of turns in coils $x$, $y$ and $z$, Fig. 4, is proportional to the length of vectors CC, OC and CD, which correspond respectively to the voltages produced by such coils when linked by equal fluxes, at which time the resultant secondary voltage is a 34 per cent quadrature component OD. When maximum flux links the $y$ coil and minimum flux links the $x$ and $z$ coils, the voltage of the $y$ coil is OA, that of the $x$ coil A$a$, and that of the $z$ coil $a$B, yielding the resultant voltage OB. When maximum flux links the $x$ and $z$ coils and minimum flux links the $y$ coil, the voltage of the $y$ coil is represented by vector OE, that of the $x$ coil by E$e$, and that of the $z$ coil by $e$F, yielding the resultant voltage OF. It is seen that the quadrature component is constant but is less in proportion to the maximum reversible speed control component voltage as compared to Fig. 3. In Fig. 6, $$\frac{OE}{OA}$$

is the ratio of minimum to maximum flux, and $$\frac{OC}{OA}$$

is the ratio of average to maximum flux.

While this form of voltage regulator is less efficient in the use of copper than the usual double induction regulator arrangement, it nevertheless has the advantage of being all in one unit with all the windings on one member, which is preferably the stationary member, so that no slip rings or flexible connections are necessary. The extent of necessary adjustment of the rotor is also very much smaller.

It will be apparent that the number of slots in the stator and rotor are not confined to twelve and six respectively, and that other numbers of slots can be used. It is equally permissible to place the primary winding at the top of the slots, nearer to the openings, and the secondary winding at the bottom. Similarly the windings may be located on the rotor if desired. The primary and/or secondary windings may also be wound for different numbers of phases, and other numbers of magnetic poles can be used.

What I claim as new and desire to secure by Letters Patent of the United States is:

1. A voltage regulator for obtaining a secondary voltage which has a reversible voltage component and a constant voltage component in quadrature relation to the reversible voltage component, comprising cooperating slotted stator and rotor core members one having twice as many slots as the other, a conventional polyphase distributed primary winding wound in the core member having the larger number of slots and a secondary winding having coils wound about individual teeth of the core member having the larger number of slots and having coils of the same phase per pole wound about adjacent teeth and connected in series opposition.

2. A voltage regulator for producing a secondary voltage which has a reversible component and a constant component in quadrature relation to the reversible component comprising a slotted core stator member having a conventional distributed primary winding wound in the slots thereof and a secondary winding having coils wound about individual teeth thereof, the secondary coils which are wound about adjacent teeth and which belong to the same phase being connected in series opposition, and a rotor core member cooperating with said stator, said rotor core member having half as many slots as the stator core member.

3. A voltage regulator for producing a secondary voltage which has a reversible component and a constant component in quadrature relation to the reversible component comprising cooperating core members, one core member being slotted and provided with a conventional distributed primary winding in the slots thereof and a secondary winding having coils wound about individual teeth, the secondary winding having three coils per phase per pole on three consecutive teeth with the center coil connected in opposition to the other two coils, the other core member having one-half the number of teeth of the wound core member and said two core members being relatively adjustable for the purpose of varying the relative amounts of primary flux which cuts said oppositely connected secondary coils.

4. A voltage regulator for producing a secondary voltage which has a reversible component and a constant component in quadrature relation to the reversible component, comprising a slotted stator core member having a conventional distributed primary winding thereon and a secondary winding comprising coils wound about individual teeth of said stator member, said secondary winding having three such coils per phase per pole on three consecutive teeth of the stator with the center coil connected in series opposition to the other two coils, the relative number of turns in such coils being unequal and selected to obtain a desired relation between the variable and quadrature component voltages, and an unwound slotted rotor core member having one-half as many slots as the stator member cooperating with said stator core member for varying the flux distribution between said oppositely connected secondary coils.

5. A voltage regulator comprising a stationary magnetic core member and a cooperating rotatable magnetic core member, said core members being concentrically arranged and having their adjacent facing surfaces slotted with a greater number of slots and teeth in the stationary core member than in the rotatable core member, primary and secondary alternating-current windings in the slots of the stationary core member, the secondary winding being made up of coils having a pitch equal to one-half of the rotor slot pitch with phase groups of adjacent secondary coils connected in series opposition.

EMERSON C. BARWICK.

REFERENCES CITED

The following references are of record in the file of this patent:

UNITED STATES PATENTS

| Number | Name | Date |
|---|---|---|
| 700,847 | Steinmetz | May 27, 1902 |
| 2,230,945 | Hansell | Feb. 4, 1941 |
| 589,674 | Sleeper | Sept. 7, 1897 |
| 1,964,265 | Markley | June 26, 1934 |
| 1,989,172 | Markley | Jan. 29, 1935 |
| 1,423,926 | Faccioli | July 25, 1922 |
| 1,650,947 | Latour | Nov. 29, 1927 |
| 1,435,813 | Cutting et al. | Nov. 14, 1922 |
| 1,417,913 | Heyland | May 30, 1922 |